United States Patent [19]
Bach et al.

[11] Patent Number: 5,781,739
[45] Date of Patent: Jul. 14, 1998

[54] IMS/WWW MAPPING SYSTEM

[75] Inventors: Mark Alan Bach; In Ha Chung; Judith E. Hill; Steve T. Kuo; Theresa H. Lai; Allen G. Lee, all of San Jose; Richard S. Uyehara, Cupertino, all of Calif.

[73] Assignee: International Business Machines Corp., Armonk, N.Y.

[21] Appl. No.: 775,606

[22] Filed: Dec. 31, 1996

[51] Int. Cl.[6] ................................................. G06F 17/30
[52] U.S. Cl. ..................... 395/200.57; 395/200.58; 707/1; 707/100; 707/616
[58] Field of Search ................. 395/200.57, 200.58; 707/1, 100, 616

[56] References Cited

U.S. PATENT DOCUMENTS

| | | | |
|---|---|---|---|
| 5,280,610 | 1/1994 | Travis | 707/103 |
| 5,329,619 | 7/1994 | Page et al. | 395/200 |
| 5,440,547 | 8/1995 | Easki | 370/395 |
| 5,442,779 | 8/1995 | Barber et al. | 707/4 |
| 5,452,445 | 9/1995 | Hallmark | 707/2 |
| 5,455,948 | 10/1995 | Poole et al. | 395/650 |
| 5,471,615 | 11/1995 | Amatsu et al. | 395/200.32 |
| 5,487,064 | 1/1996 | Galand | 370/392 |
| 5,544,325 | 8/1996 | Denny et al. | 395/200.17 |
| 5,546,582 | 8/1996 | Brockmeyer et al. | 395/650 |
| 5,563,878 | 10/1996 | Blakeley et al. | 370/60 |
| 5,564,050 | 10/1996 | Barber et al. | 395/600 |

*Primary Examiner*—Thomas G. Black
*Assistant Examiner*—Diane O. Mizrahi
*Attorney, Agent, or Firm*—Randy W. Lacasse; David J. Kappos; Marilyn S. Dawkins

[57] ABSTRACT

IMS Web provides for a method and apparatus which enables a user to communicate with IMS-based applications using a Web Browser. An input HTML form is used to associate IMS transaction data which is then supplied to a CGI-BIN program which uses IMS Web generated C++ class definitions to determine classes for each logical page. The CGI-BIN program interacts with the IMS database through an TCP/IP OTMA adapter and an output HTML communicates with the Web client.

19 Claims, 10 Drawing Sheets

IMS/WWW MAPPING SYSTEM

COPYRIGHT NOTICE

Portions of the sure of this patent document, in particular Appendix A, contain unpublished material which is subject to copyright protection. The copyright owner, International Business Machines Corporation, has no objection to the facsimile reproduction by anyone of the patent document or the patent disclosure, as it appears in the U.S. Patent and Trademark Office patent files or records, but otherwise reserves all rights whatsoever.

BACKGROUND OF THE INVENTION

Field of the Invention

The present invention relates generally to the mapping of communication protocols. More specifically, the present invention relates to a method and apparatus for effectively communicating between the World-Wide Web(WWW) and IBM's Information Management System(IMS).

The World Wide Web(WWW) represents the modern day version of the traditional library. Volumes of computer stored information are stored on the electronic shelves of computer servers throughout the world. Specific items of interest are located using electronic card catalog numbers represented by ARPA's TCP/IP naming conventions, e.g. www.ibm.com. Quick and accurate access to the various documents and files located on the "Web" has become paramount for today's computer users.

computer stored document is "checked-out" by the user by creation of a link between their computer and the server where the end-document is stored. A TCP/IP link is created and the transference of information managed by the protocols of this domain. Problems can occur while trying to connect with platforms of different architectures such as IBM's IMS. The WWW communication protocols, have failed heretofore to provide a direct link into the world of IMS. The present invention will provide the conduit through which this connection can be made.

Accordingly, it is a principal object of the present invention to provide the ability to map HTML and web server communications to IMS.

It is another object of the invention to provide the ability of using a TCP/IP protocol to communicate to IMS through OTMA.

It is another object of the invention to address the problems associated with decoding the HTTP protocol from the web client, and parsing it directly into IMS through OTMA without the need of a web server.

It is another object of the invention to provide the ability to map clients from other non-host platforms to IMS transactions.

It is another object of the invention to translate MFS source for the purpose of running an IMS transaction from a workstation environment.

These and other objects can be accomplished by the specification, drawings and claims that follow.

DEFINITIONS

The following definitions may be useful in furthering the understanding of the present invention:

IMS—Information Management System develop by IBM consisting of a hierarchical database manager and a transaction message manager. IMS uses a set of program modules that intercept all requests that an application program makes when accessing data from a database or other terminals. IMS uses an interface language called Data Language/I(DL/I) for describing the DBMS-requests and runs on a multiple virtual storage(MVS) operating system. Transaction requests can be entered into the system at one IMS location, processed and returned to one or more IMS locations.

MFS—Message Format Service buffers communication of formats between IMS and output devices.

MFLDs—message fields.

MIDs—message input descriptors which define the communication structures of an input message for MFS.

MODs—message output descriptors which define the communication structures of an output message for MFS.

DIFs—device input formats.

DOFs—device output formats.

TCP/IP—Transmission Control Protocol/Internet Protocol reflects standards for communication on the Internet including the World Wide Web.

HTML—hypertext mark-up language enables embedding of simple commands within standard ACSII text documents to provide an integrated visual display. HTML is used in Internet and WWW applications allowing the user to specify text size and flow, integrate audio and pictures, create links and to create interactive forms.

GUI—graphical user interface which allows interaction between a computer user and an application by graphical commands as opposed to typed commands.

CGI—Common Gateway Interface provides an interface for running programs on a World Wide Web server. The most common uses are for input forms with dynamic return forms. The CGI-BIN is the directory where a specific CGI program is located on the server.

DLL—Dynamic Link Libraries provide communication, conversion and formatting of messages.

OTMA—Open Transaction Multiple Access.

RACF—Resource Access Control Facility includes a collection of interrelated or independent data stored together without unnecessary redundancy.

WEB CLIENT—is a computer user connected to the World Wide Web. Throughout the disclosure Web Client, user and/or computer user can be interchanged as equivalents.

SUMMARY OF THE INVENTION

The present invention, hereafter IMS Web, provides for a method and apparatus which enables a user to communicate with IMS-based applications using a Web Browser. IMS Web provides a way for a user to reuse existing IMS transactions in the World Wide Web (WWW). An input HTML form is used to collect IMS transaction data which is then supplied to a CGI-BIN program which uses IMS Web generated C++ class definitions to determine classes for each logical page. The CGI-BIN program interacts with the IMS database, IMS processes the data, returns the result to the CGI-BIN program and an output HTML communicates with the Web client. IMS Web consists of an IMS Web Studio, IMS Web Server DLLs and TCP/IP OTMA Adapter.

A IMS Web Studio directs a potential Web client through a series of steps to browse and download MFS source information which is used to produce an input HTML form and C++ classes necessary to parse the input strings in a CGI-BIN program also created by the IMS Web Studio. The parsed strings from the CGI-BIN program communicate to an TCP/IP OTMA adapter which communicates to IMS using MFS input codes(MIDs). After processing the user's request, e.g. a search for items in an IMS database, MFS output codes(MODs) communicate the data to the adapter, back to the CGI-BIN program to an modifiable output HTML which the Web client views or otherwise extracts the requested data values. IMS Web Studio is a GUI tool that provides the following functions:

The final output from IMS Web Studio consists of two files: the CGI-BIN program and the input HTML form. A user installs these files on their Web server to provide access to the IMS transaction.

IMS Web Server DLLs are Dynamic Link Libraries that are called by the generated programs. These DLLs provide the functions of: communication to and from an TCP/IP OTMA Adapter which accesses IMS, conversion of messages between workstation and host, and MFS-like formatting of messages.

The TCP/IP OTMA Adapter is a TCP/IP server that enables remote workstations to exchange messages with the IMS system.

DESCRIPTION OF THE PREFERRED EMBODIMENTS

Figure 1:
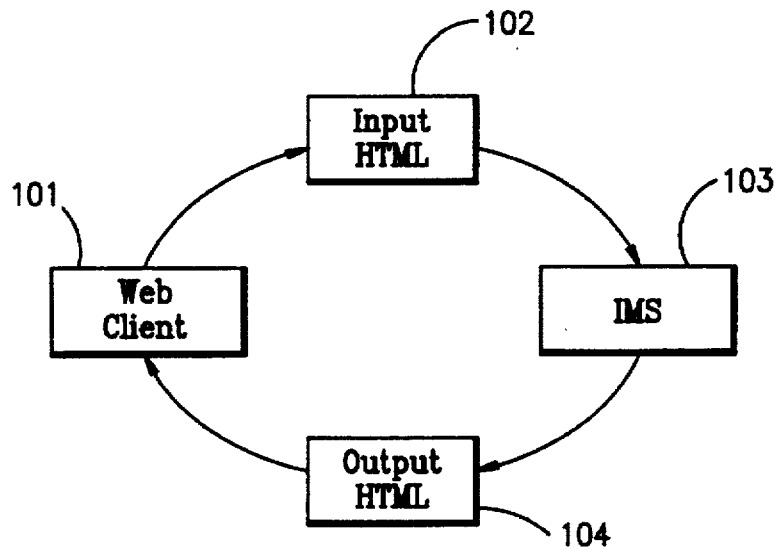
FIG. 1 illustrates an overview of the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates an overview of the present invention. A Web client 101, defined as a computer user with access to the World Wide Web through a commercially available connection, places input request data into an input HTML form 102. Input data is mapped, through various steps to be discussed in detail below, to an IMS database 103. An application program running on the IMS processes the requested data and returns the results to output HTML form 104. The output form may be viewed by the client 101 or selected data may be extracted further using additional steps.

Figure 2:
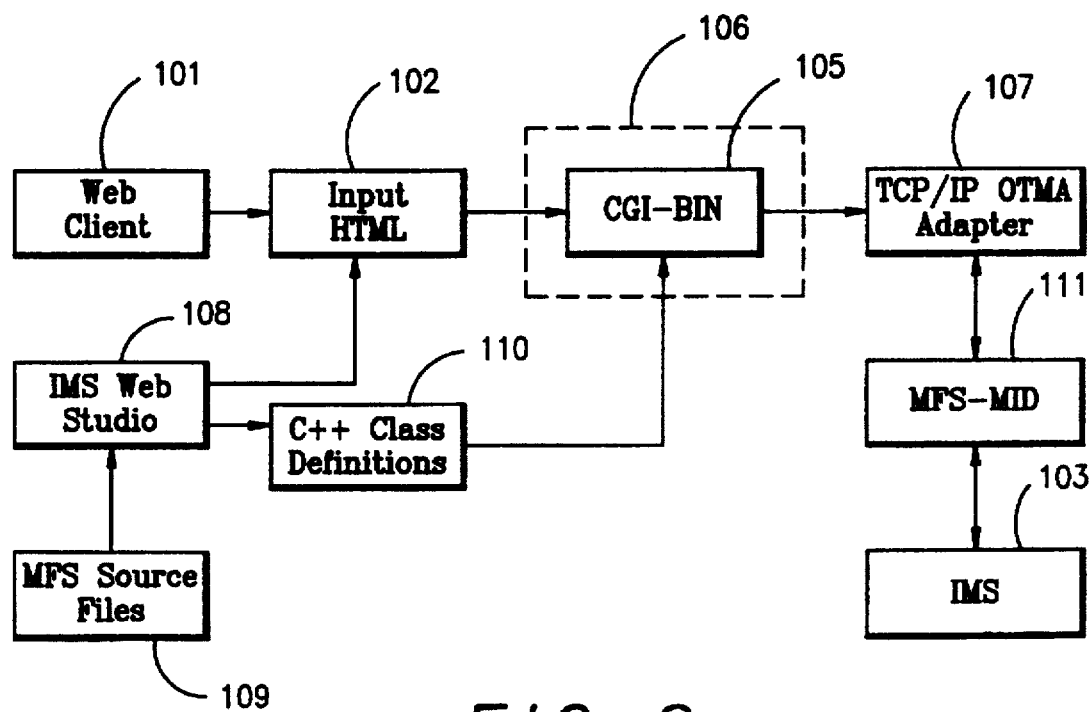
FIG. 2 illustrates the input development and request stages of the present invention.
Figure 3:
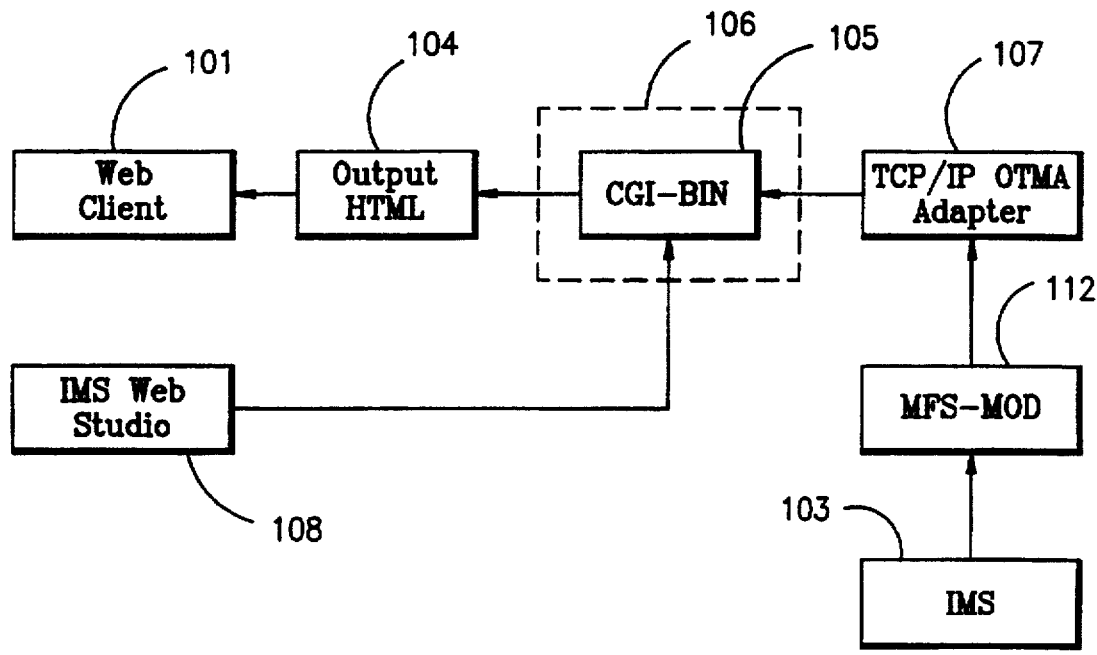
FIG. 3 illustrates the output development and returned stages of the present invention.
Figure 4:
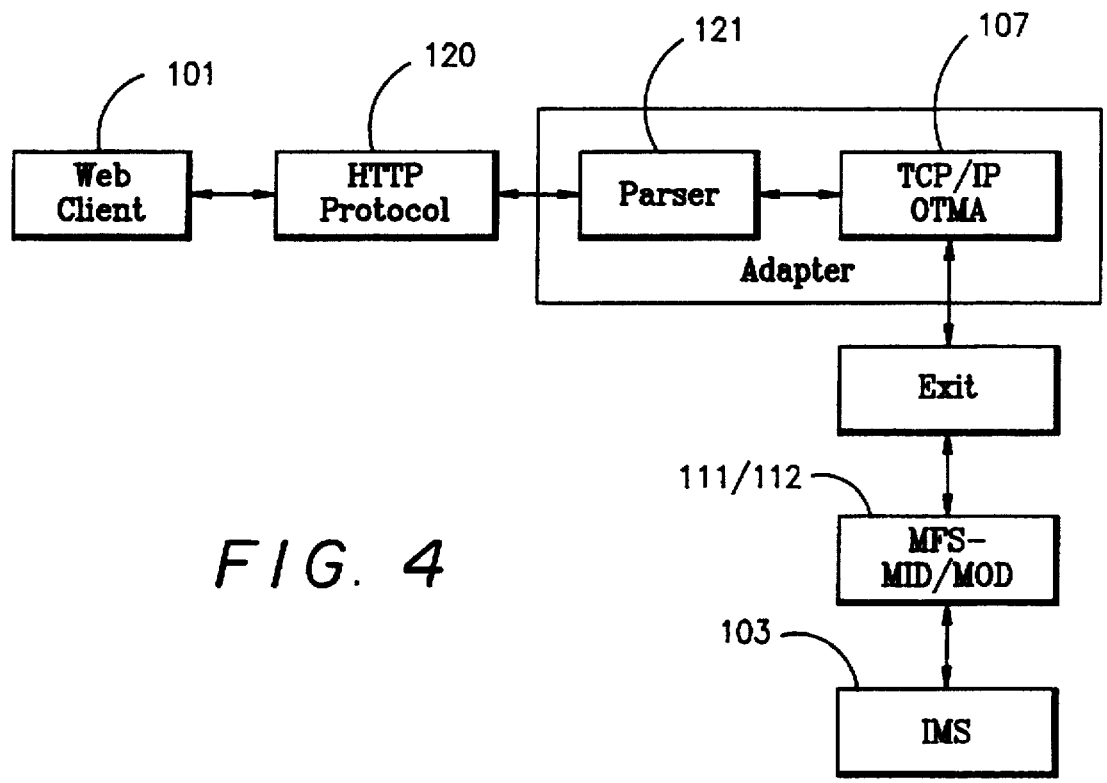
FIG. 4 illustrates an alternative embodiment without a Web server.

FIG. 2 illustrates the input HTML form development and request stage for information contained within one or more databases located in the IMS system 103. Using the IMS Web Studio 108 of the present invention, a Web client can download available MFS source files 109. The source files are then used to develop a corresponding input HTML form and to create the classes necessary to build the CGI-BIN program 105 located on a Web server 106. Once an input HTML form 102 is created it may be populated by a user to request specific information which may be located within one or more databases located within the IMS Input strings derived from the input HTML form 102 are sent to a CGI-BIN program on the Web Server 106 where they are parsed using classes derived from C++ class definitions 110. The parsed output strings are then converted from TCP/IP to Open Transaction Multiple Access protocol by adapter 107. The adapter can communicate directly with IMS. Once the requested data request is processed by IMS it is returned through the adapter to the Web Server where the CGI-BIN program, using MFS MODs sends the data format and values to a modifiable output HTML form 104.

A more detailed recitation of the environment and specific programming formats of the present invention will be described below:

IMS Web—MFS Function

The IMS Message Format Service (MFS) makes it possible for an IMS application program to communicate with different types of terminals without changing the way it reads and builds messages. MFS formats input data from a device or remote program for presentation to the IMS application program, and then formats the output data from an application program data for presentation to the output device or remote program.

The IMS Web server code provides a function similar to MFS; it prepares IMS application program input and output messages based on information found in MFS definitions. IMS Web uses only the information in MFS Message Input Descriptors (MIDs-111) and MFS Message Output Descriptors (MODs-112) to format input and output messages. IMS Web does not use the information found in the associated MFS Device Input Formats (DIFs) and MFS Device Output Formats (DOFs).

In place of the MFS device, IMS Web uses a combination of a CGI-BIN program 105 and Web browser HTML. A Web client 101 inputs IMS transaction data via an IMS Web-supplied HTML form 102. The form data is submitted to an IMS Web-supplied CGI-BIN program 105. The CGI-BIN program then formats the input message, based on an MFS MID definition. IMS Web submits the input message to the IMS application, retrieves the output message, formats it based on an MFS MOD definition, then returns the data via the CGI-BIN program to an output HTML form 104.

The IMS Web Studio tool uses the MFS MID 111 and MOD 112 utility control statements to generate the IMS Web-supplied HTML and CGI-BIN programs for a transaction. IMS Web supports most MFS utility control statements and options that relate to the formatting of input and output messages. The descriptions that follow make note of any exceptions.

The following sections describe how IMS Web uses each MFS utility control statement to format input and output messages.

MFS Utility Control Statements

Requirement: The MFS definitions that you input to IMS Web must first have been processed by the MFS Language Utility to ensure that they are valid MFS definitions.

MSG Statement Set

MSG
- label
  - Identifies this message descriptor to IMS Web.
- TYPE=
  - Identifies this message definition to IMS Web as an input or output message definition.
- SOR=
  - IMS Web does not use the SOR=keyword.
- OPT=
  - Specifies the message formatting option that IMS Web uses to edit messages.
  - IMS Web supports options 1 and 2, but does not support option 3.
- NXT=
  - IMS Web does not use the NXT=keyword. The single MID that IMS Web uses is selected using the IMS Web Studio tool 108. The IMS application program provides the MOD that IMS Web use to format the single output message.
- PAGE=
  - Because IMS Web formats application program output messages for an HTML form that is controlled by a CGI-BIN program, instead of for a specific device that is controlled by an operator, IMS Web implements operator logical paging differently. By default, the generated code uses the getHTML method to present all fields of all output logical pages to the client browser. As an alternative, you can modify the CGI-BIN program to use a set of IMS Web-supplied methods to sort through the logical pages of an output message and present the individual pages via modified HTML.
  - IMS Web's implementation of operator logical paging does not depend on the value of the PAGE= keyword.
- FILL=
  - Specifies a fill character for output attributes. IMS Web does not use DPAGE statements. Instead, the FILL=specification on the MSG statement determines the fill character. The default value is C". IMS Web processes output attributes as follows (this does not include the system control area or attribute bytes):
    - Bytes containing X'00' are replaced by X'40'.
    - X'3F' in an output message field terminates significant data, or indicates absence of data.
    - Output data is converted to the IMS Web server code page and encoding scheme.
    - Output message fields that contain less significant data than the defined field length are justified and filled with the fill character. If FILL=PT or FILL=NULL, the amount of significant data is used as the size of the output attribute.

LPAGE
- IMS Web uses the LPAGE statement to identify a group of segments and fields that comprise a logical page.
- An input or output message definition can contain multiple logical pages. When an input message definition contains multiple logical pages, you must select a logical page and provide its name to the IMS Web Studio tool 108 when the transaction classes are generated. IMS Web's processing of multiple output logical pages is described in the PAGE=keyword of the MSG statement.
- label
  - Identifies the logical page to IMS Web, and is used by IMS Web as the name of the corresponding generated class. The label is optional in MFS source. If label is not specified, you can provide a label to IMS Web Studio, or IMS Web generates a label of the form HWSLPGdd, where dd=00 to 99.
- SOR=
  - IMS Web does not use the SOR=keyword.
- COND=
  - Describes a conditional test performed by IMS Web. If the test is successful, the segment and field definitions following this logical page are used to format output.
- NXT=
  - IMS Web does not use the NXT=keyword. The IMS application program provide the MOD that IMS Web uses to format the single output message.
- PROMPT=
  - IMS Web does not use the PROMPT=keyword.

PASSWORD
- IMS Web does not use the PASSWORD statement.

SEG
- IMS Web uses the SEG statement to delineate message segments.
- label
  - IMS Web does not use the label.
- EXIT=
  - IMS Web does not provide support for segment edit routines. You can modify the CGI-BIN program so that it performs a similar function by editing the segment at the attribute level.
- GRAPHIC=
  - IMS Web does not use the GRAPHIC=keyword. If you need uppercase translation of segment data, you can modify the CGI-BIN program to translate the segment at the attribute level.

DO
- IMS Web uses the DO statement, and the associated ENDDO statement, to iteratively generate MFLD statements. The use of generated names is described below.

MFLD
- IMS Web uses the MFLD statement to identify a message field as part of a message input or output segment.
- label
  - Identifies the input or output message field. An attribute of the associated logical page's class is generated for each message field. The user can specify the attribute name when the class is generated, using IMS Web Studio: Otherwise, the attribute name is determined as follows: If dfldname is specified, it is used.

If dfldname is not specified, the MFLD label is used.

If the MFLD label is not specified, IMS Web generates an attribute name of the form HWSMFddd, where ddd=000 to 999.

For INPUT messages:

dfldname

IMS Web formats the data of the corresponding attribute as a field of the input message. Unless the user overrides it with IMS Web Studio, dfldname is the name of the attribute and the name of the corresponding input field on the HTML form.

'literal' only

IMS Web inserts the literal in the input message. This type of input message field does not have a corresponding input field on the HTML form.

(dfldname, 'literal')

IMS Web inserts the literal in the input message field if it does not receive data in the corresponding input field on the HTML form.

For OUTPUT messages:

dfldname

IMS Web formats the data of the output message field to the corresponding generated attribute, which in turn displays on the output HTML form. Unless you override it with IMS Web Studio, dfldname is the name of the attribute and the name of the corresponding output field on the HTML form.

(dfldname, 'literal')

IMS Web formats the literal to the corresponding generated attribute, which in turn displays on the output HTML form. Unless you override it with IMS Web Studio, dfldname is the name of the attribute and the name of the corresponding output field on the HTML form. Space for the literal is not allocated in the output message segment that the application program supplies.

(dfldname,system—literal)

IMS Web formats the system-literal to the corresponding generated attribute, which in turn displays on the output HTML form. Unless you override it with IMS Web Studio, dfldname, is the name of the attribute and the name of the corresponding output field on the HTML form. Space for the literal is not allocated in the output message segment that the application program supplies.

IMS Web supports the following system-literals:

LTNAME (TBD)

TIME

DATE 1

DATE 2

DATE 3

DATE 4

LPAGENO (TBD)

If the MFS source specifies an unsupported system-literal, IMS Web uses blanks to pad the length of the system-literal.

(,SCA)

IMS Web formats the data of the output message field to the corresponding generated attribute. The system control area does not display on the output HTML form. You can modify the CGI-BIN program to examine the system control area attribute. Unless you override it with IMS Web Studio, the label of the MFLD statement is the name of the attribute. If there is no label, IMS Web uses HWSSCAdd, where dd=00 to 99.

IMS Web gives the generated attribute the same format as in the application program data. It does not convert the data to the IMS Web server platform, and it does not replace any X'00' bytes.

nothing

If none of the parameters dfldname, (dfldname, 'literal'), (dfldname, system-literal), or (,SCA) is specified in the MFS source, the output message field is a filler or spacer. IMS Web formats the data of the output message field to the corresponding generated attribute, but it does not display on the output HTML form. Unless you override it with IMS Web Studio, the MFLD statement label is the attribute name.

LTH=

IMS Web uses the LTH=keyword to determine the length of the input or output message field. If LTH=is omitted for a literal, IMS Web uses the literal length for the field length.

IMS Web supports the form (pp,nn), where pp specifies which byte of the corresponding attribute is to be the first byte of data for the input message field.

For example, if an input MFLD is defined to have no attribute bytes and LTH=(2,5), the default HTML form has a maximum text entry field length of 5. If you enter 3 data characters in the entry field, the value of the corresponding attribute consists of the 3-character string. IMS Web uses the second and third bytes of the character string for the data of the input message field.

JUST=

For input, IMS Web LEFT or RIGHT justifies and truncates the data of the input message field depending on the amount of data in the corresponding attribute.

For example, if an input MFLD is defined to have no attribute bytes, JUST=RIGHT, FILL=C", and LTH= 5, the default HTML form has a maximum text entry field length of 5. If you enter 3 data characters in the entry field, the value of the corresponding attribute consists of the 3-characters string. IMS Web builds a message input field of 5 characters, with the rightmost 3 being the attribute value and the leftmost 2 containing the blank fill character.

Truncation is not necessary when the default HTML form is used, because the maximum length of a text entry field (MAXLENGTH) is set to the defined length of the input field.

For output, IMS Web LEFT or RIGHT justifies and truncates the data of the corresponding attribute depending on the amount of data in the output message field.

For example, an output MFLD is defined to have no attribute bytes, JUST=RIGHT, LTH=5, and the output message statement (MSG) is defined with FILL= C". If the field in the output message contains 4 data characters followed by X'3F', IMS Web builds the attribute value as a string of 5 characters beginning with a blank fill character and followed by the 4 data characters from the output message field.

ATTR=

IMS Web uses the ATTR=keyword to determine the number of attribute bytes to set aside in the input and output message. The maximum length (MAXLENGTH) of the corresponding text entry field on the generated input HTML is the defined field length minus the number of attribute bytes.

The attribute bytes are not to be present in the generated output HTML. However, the attribute bytes are available to the CGI-BIN program as an attribute of the generated output logical page class. The attribute name is attrname__ATTR, where attrname is the name of the attribute that corresponds to the data portion of the field. Attribute bytes are not converted from the host to the server platform. IMS Web initializes the attribute bytes to blanks on input. On output, the bytes are available to the CGI-BIN program unconverted, on the server platform.

FILL=

IMS Web uses the FILL=keyword to determine which character to use to pad an input message field when the length of the data received from the HTML form/CGI-BIN program is less than the length of the field. IMS Web converts fill characters specified as C'c' from the server platform code page to the host platform code page. Fill characters of the form X'hh' are not converted

EXIT=

IMS Web does not provide field edit routines.

ENDDO

IMS Web uses the ENDDO statement and associated DO statement to iteratively generate MFLD statements.

MSGEND

IMS Web uses the MSGEND statement to terminate an input or output message definition.

FMT Statement Set

IMS Web does not use this statement set.

PDB Statement Set

IMS Web does not use this statement set.

TABLE Statement Set

IMS Web does not use this statement set.

Compilation Statements

IMS Web does not use the following compilation statements:

EJECT
END
PRINT
SPACE
STACK
TITLE
UNSTACK

IMS Web handles other compilation statements as follows:

ALPHA

IMS Web does not use the ALPHA compilation statement. If you use MFS source that contains the ALPHA statement, IMS Web might consider the MFS source to the unusable.

COPY

IMS Web does not use the COPY compilation statement. Until IMS Web supports the COPY statement, the MFS source referenced by the COPY statement must be copied into the MFS source presented to IMS Web. If you use MFS source that contains the COPY statement, IMS Web might consider the MFS source to be unusable.

EQU

IMS Web does not use the EQU compilation statement. Until IMS Web supports the EQU statement, substitution variables used in the MFS source presented to IMS Web must be replaced by their corresponding MFS source. If you use MFS source that contains the EQU statement, IMS Web might consider the MFS source to be unusable.

RESCAN

IMS Web does not use the RESCAN compilation statement. Until IMS Web supports the RESCAN statement, variables used in the MFS source presented to IMS Web must be replaced by their corresponding MFS Source. If you use MFS source that contains the RESCAN statement, IMS Web might consider the MFS source to be unusable.

IMS Web—Mapping Transactions To Classes

IMS Web Studio generates a set of C++ files that contain class definitions and implementations to enable IMS transactions. In general, the C++ classes are derived from the MFS source for the transaction as follows:

A C++ class is generated for each logical page of transaction.

The generated class takes the logical page name as its name. You can override this name with IMS Web Studio.

The fields of a logical page become attributes (or data members) of the generated class for that page.

The name of a generated attribute is the field name. You can override this name with IMS Web Studio.

Access methods are generated for each attribute. Both get and set methods are generated for input logical page attributes, while only get methods are generated for output logical page attributes.

Input Logical Page

Figure 5:
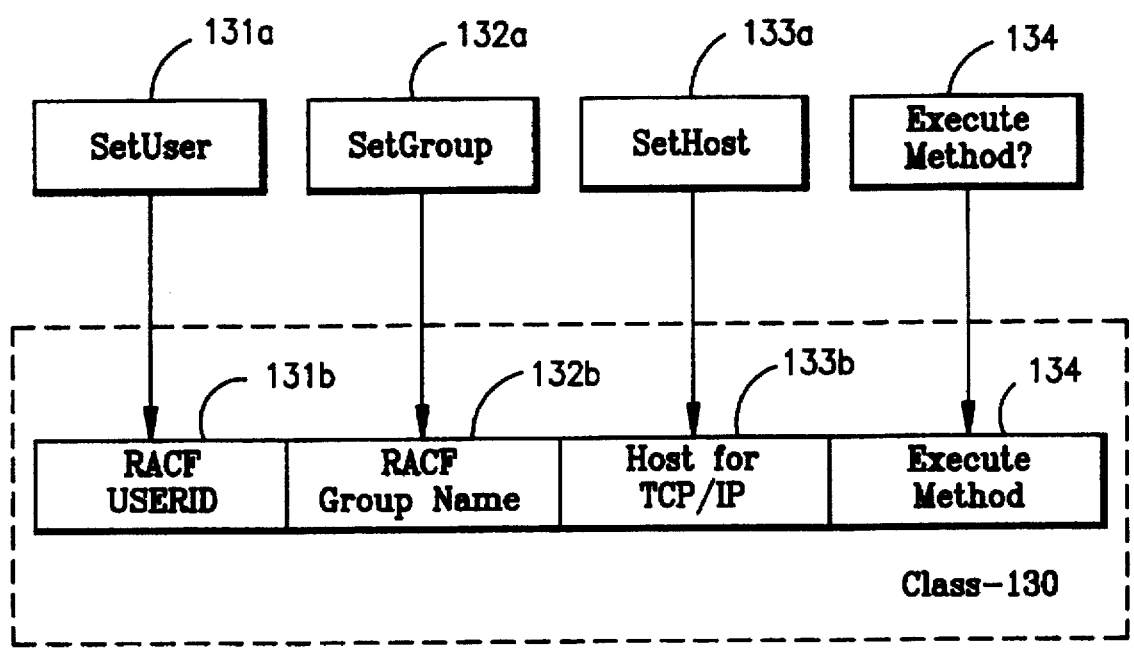
FIG. 5 illustrates developing a class for parsing HTML input data by the CGI-BIN program.

The following methods are specific to a class that is generated for an input logical page as is shown in FIG. 5:

A setUser 131a method to set the RACF userid 131b

A setGroup 132a method to set the RACF group name 132b

A setHost 133a method to set the hostname for TCP/IP 133b

An execute method 134 to send the request to IMS and return a class instance for an output logical page.

The following files are generated specifically for an input logical page:

An input HTML form that gathers required information and starts the CGI-BIN program.

A C++ class that parses the input string from the input HTML form. The generated CGI-BIN program invokes this class to parse the input string from the Web browser.

Output Logical Page

The following methods are specific to a class that is generated for an output logical page:

A genHTML method that returns a buffer with the generated HTML code to the Web client. The generated CGI-BIN program invokes this method to return the output message from the transaction to the Web browser.

A genList method that returns the output message from the transaction in the form of a name-and-value pair list. You can use this method to customize the CGI-BIN program and the output HTML. The generated CGI-BIN program does not invoke this method.

The Transaction Code

The transaction code that IMS Web uses depends on the MFS source. For example:

If the first field of the input message is a literal, as in

| MSGIN | MSG | TYPE=INPUT |
|-------|-----|------------|
|       | MFLD | 'TRANA'   | the transaction code is TRANA. This type of input message field is not displayed on the input HTML form.

If the first field of the input message uses a default literal, as in

| MSGIN | MSG | TYPE=INPUT |
|-------|-----|------------|
|       | MFLD | (TRNFLD,'TRANA'),LTH=6 | the transaction code is TRANA if the user did not enter anything into the text entry field TRNFLD on the input HTML form, otherwise the value entered.

If the first field of the input message is

| MSGIN | MSG | TYPE=INPUT |
|-------|-----|------------|
|       | MFLD | TRNFLD,LTH=6 | the transaction code is anything that is entered into the text entry field TRNFLD on the input HTML form.

IMS Web—Generating Code

The following files are generated for each project:

HTMproject_name.HTM
  An input HTML form that is used to input data for the message that goes to the IMS application, and that starts the CGI-BIN program.

CGIproject_name.CPP
  A CGI-BIN program that uses the class generated for the input logical page, input_lpage_name, to submit a request (input message) to IMS as follows:
    Uses the parser class, HTMproject_name, to parse the input from the generated input HTML form.
    Invokes the execute method of the class generated for the input logical page to send the request to IMS. The execute method returns one of the generated classes for output logical pages.

The generated CGI-BIN program then uses one of the classes generated for the output logical pages, output_lpage_name, to build and send the output HTML as follows:
  Invokes the genHTML method of . . . to get a buffer with the generated HTML code to be returned to the Web client.

HTMproject_name.HPP and HTMproject_name.CPP
  A C++ class that parses the input string from the generated input HTML form. The CGI-BIN program uses this class to parse the input from the generated input HTML, HTMproject_name.HTM.

input_lpage_name.HPP and input_page_name.CPP
  A single class is generated for the input logical page. This class includes the following methods:
    A setUser method to set the RACF userid
    A setGroup method to set the RACF group name
    A setHost method to set the hostname for TCP/IP
    An execute method to submit the request (input message) to IMS and return one of the generated classes for the output logical pages.

output_lpage_name.HPP and output_lpage_name.CPP
  A class is generated for each output logical page. Each class includes the following methods:

A genHTML method to build a buffer of HTML to be returned to Web Client
  A genList method to build a name/value pair list that you use to generate customized HTML code to be returned to Web Client (for optional use if you want to modify the generated CGI-BIN program and HTML)

CGIproject_name.MAK
  A makefile that builds the CGproject_name.EXE program to be run on the Web server. You must move file CGproject_name to the Web server. File HTMproject_name.HTM . . . ?

A. IMS Web—IMS Web Studio Tool (FIGS. 6–12)
  1. Starting IMS Web Studio(not shown)
  2. Creating a Project In IMS Web Studio(FIG. 6)
  3. Associating MFS Source With the users Project(FIGS. 7 and 8)
  4. Generating Code(FIGS. 9–12)
  5. Building a CGI-BIN Executable File(not shown)

B1. IMS Web—Starting IMS Web Studio

The IMS Web Studio icon is located in the IMS Web folder. To access the icon, a user first selects the Start button on the user's screen, then selects from the following menu options in sequence:
  1. Programs
  2. IMS Web
  3. IMS Web Studio To start IMS Web Studio, a user double-clicks on the IMS Web Studio icon. The IMS Web Studio window opens, providing options for to use in creating a project.

B2. IMS Web—Creating a Project in IMS Web Studio

An IMS Web Studio project is a set of resources and information that is associated with building the CGI-BIN program and input HTML for an IMS transaction.

To create a new project, select the File from the IMS Web Studio window's action bar, then select New Project from the pulldown menu.

Alternatively, a user can select—Create a New Project— from the dialog box that opens when a user starts IMS Web Studio. (can open an existing project from this box.)

Figure 6:
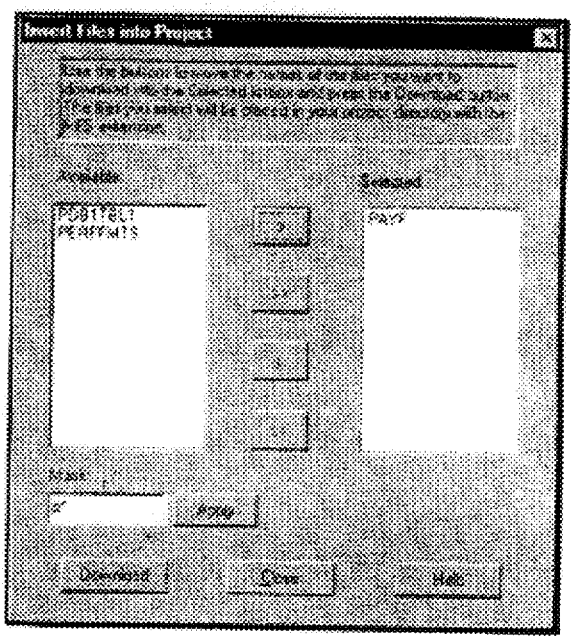
FIG. 6 illustrates an IMS Web Studio interface new project dialog box.

The next step in creating a new project is to specify project-related information in the New Project dialog box shown in FIG. 6.

B3. IMS Web—Associating MFS Source With A User's Project

After a user has created a project in IMS Web Studio, they should select and download the MFS source files that are associated with the transaction for which they want to generate code. To do this, they first select File from the project window's action bar, then select the Insert Files into Project . . . option from the pulldown menu.

Figure 7:
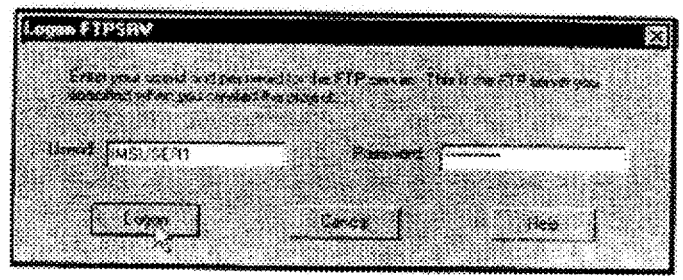
FIG. 7 illustrates an IMS Web Studio interface logon dialog box.

The Logon dialog box, FIG. 7, is displayed. A user enters their userid and password for the FTP server where the MFS source files are located, then selects the Logon push button.

Figure 8:
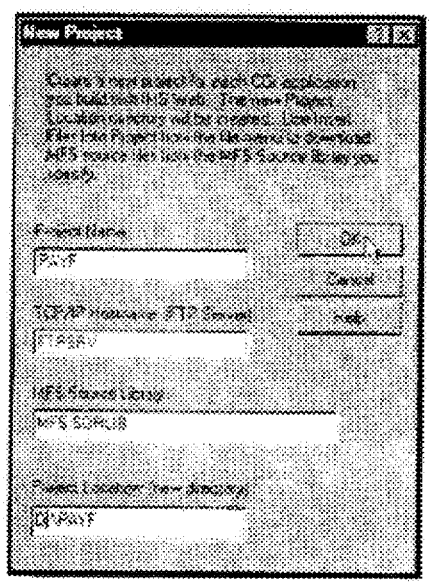
FIG. 8 illustrates an IMS Web Studio interface list of available MFS files to download.

The Insert Files into Project dialog box, FIG. 8, displays a list of available MFS source files. The user can select or deselect one or more files by selecting the appropriate directional push buttons located between the Available list box and the Selected list box. To download the selected files, the Download push button is selected.

B4. IMS Web—Generating Code

Figure 9:
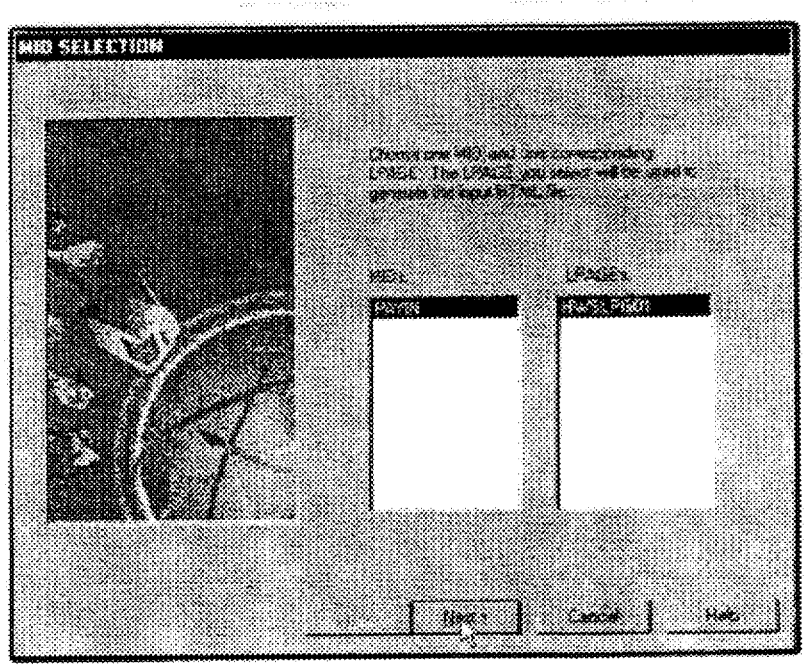
FIG. 9 illustrates an IMS Web Studio interface MID selection template.

After the user has created a project and downloaded the associated MFS source files, they select Build from the project window's action bar(not shown). Select Generate from the pulldown menu. IMS Web Studio then asks for the following information, as shown in FIG. 9:

MID name
  If multiple MIDs are specified in the MFS source set, the MIDs list box in the MID SELECTION dialog box displays a list of MID names so one can be can selected.

LPAGE name
If multiple LPAGEs are specified in the selected MID, the LPAGEs list box in the MID SELECTION dialog box displays a list of LPAGE names so one can be selected.

Transaction name
If the first input field is a literal, the literal becomes the transaction code. IMS Web Studio displays the literal as the transaction code, but the user cannot override its value.

If the first MFLD of the input message is a default literal and no data is entered for the field, the literal becomes the transaction code. IMS Web Studio displays the default literal as the transaction code, but you cannot override its value.

For all other forms of the first MFLD of an input message, the transaction code must be provided to IMS Web Studio. IMS Web adds a single blank separator to the value provided and places it in the first field of the input message. The generated HTML and class attribute for the field are reduced in length by the length of the transaction code provided to IMS Web.

Example: For the following MFS source, IMS Web Studio requires that a transaction code be entered:

| MGIN | MSG | TYPE=INPUT SOR=(CDCNC1, IGNORE), NXT=MGOUT |
|------|-----|------|
| LPA | LPAGE | SOR=(CDCNC1) |
| | SEG | |
| | MFLD | BIGFLD LTH=100 |

If transaction code MYTRAN is entered, the generated HTML has a text entry field, BIGFLD, of MAXLENGTH= 92 (length of MFLD minus the length of transaction code plus blank separator). The corresponding class attribute is a string, also of length 92. The input message presented to IMS will begin with MYTRAN, followed by the data that you entered in the HTML text entry field BIGFLD.

Figure 10:
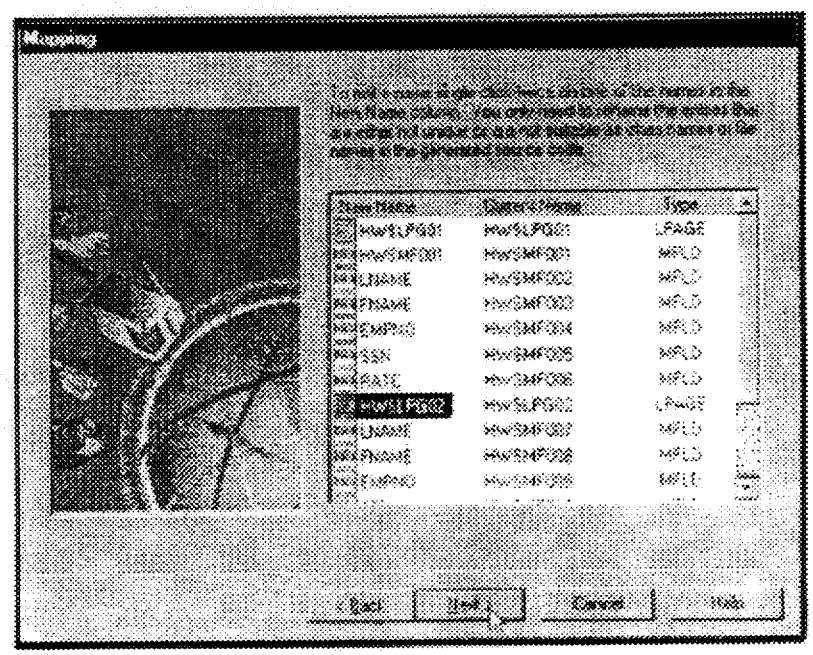
FIG. 10 illustrates an IMS Web Studio interface parsed and generated names display.

In addition, IMS Web Studio asks for the following information, as shown in FIG. 10:

Optional name overrides
MFS source files often contain LPAGE and MFLD names that are either cryptic or not specified. The parsed and generated names display so that the user can replace them with more meaningful names.

Language specification(not shown)
A list of conversion options displays so that the user can specify one, e.g. U.S. English, Latin 1, etc.

Figure 11:
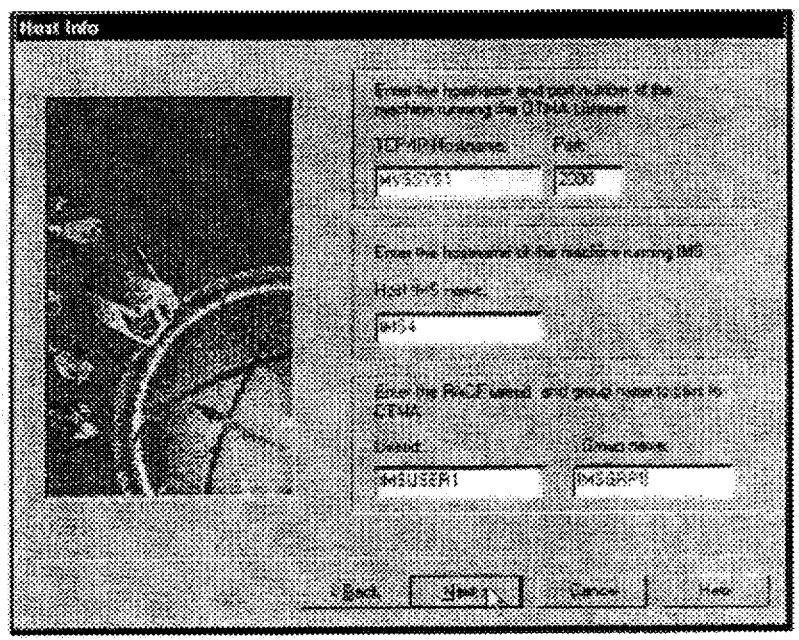
FIG. 11 illustrates an IMS Web Studio interface host information input template.

FIG. 11 illustrates an entry dialog box for Host information such as:

1. IMS Web Host TCP/IP hostname—the TCP/IP host name for the TCP/IP-OTMA adapter.
2. IMS Web Host IMS Name—the IMS name that TCP/ IP-OTMA Adapter is to connect to.
3. RACF userid and groupname—the RACF userid and groupname to be passed to the IMS OTMA
4. The Web server CGI path—the path where the CGI- BIN program installed on the user's Web server. This path is used by the generated input HTML form.

Figure 12:
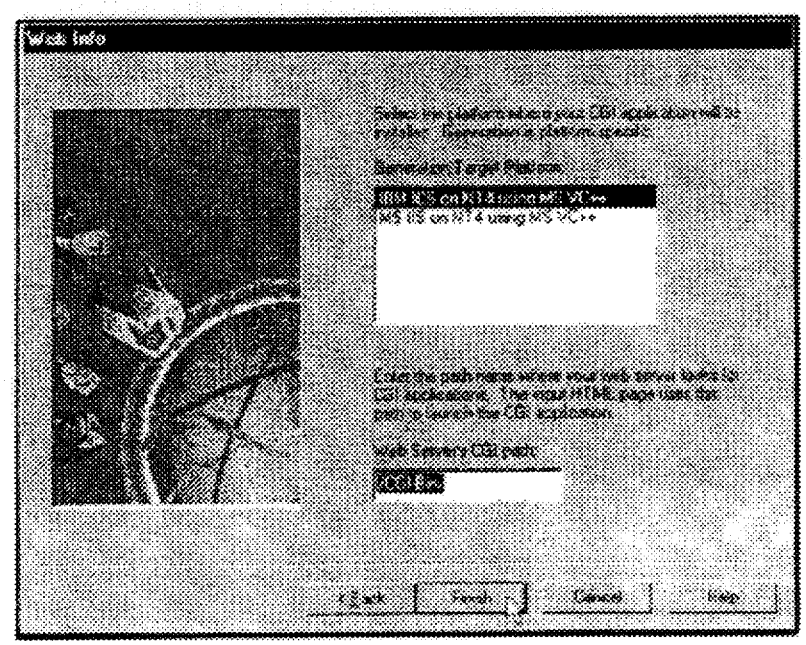
FIG. 12 illustrates an IMS Web Studio interface target platform generation template.

FIG. 12 illustrates the dialog box for inputting the Generation target platform defined as the target for which the code is generated.

B5. IMS Web—Building a CGI-BIN Executable File

The user builds the CGI-BIN executable file, 'CGproject_name.EXE', by running the generated makefile, 'Cgproject_name.MAK'.

To run the makefile, the user issues the NMAKE command from the command line in the project directory.

B. IMS Web—Incorporating Files Into the Web Server Environment

To incorporate the files that the user has created into their Web server environment, the user performs the following steps:

1. Places the CGI-BIN executable file in the directory which was user specified in IMS Web Studio ('Web Server's CGI Path'). This directory must be the same directory that their Web server uses to look for CGI- BIN scripts.
2. Places the input HTML form in the HTML directory for their Web server.
3. Links the input HTML form to an HTML file in their Web server's HTML file tree.

A Web browser user can now use the HTML form to fill in information for an IMS transaction.

C. IMS Web—Customizing Code
a. Customizing the Input HTML form
   1. How input HTML Is Generated
   2. How to Modify the Input HTML
b. Customizing Output HTML
   1. How the CGI-BIN program Is Generated
   2. How the genHTML Method Is Generated
   3. How to Modify the Output HTML D(a1) How Input HTML Is Generated The input HTML is generated based on the message input descriptor of the MFS source. The HTML consists of an HTML form with the fields of the input message (MFLDs) arranged as text entry fields of an HTML table. MAX- LENGTH is the defined length of the MFLD (that is, the LTH=value). The rows of the table are arranged in the same order as the MFLD statements within the message input descriptor, with the following exceptions:

If a field has associated attribute bytes, they are not included in the text entry field (MAXLENGTH is reduced by the number of attribute bytes).

The transaction code . . .

Field literals are not displayed as part of the input HTML. For example, for the following MFS source input message field, the corresponding HTML would not contain a text entry field for M0001:

| M0001 | MFLD | 'Test data' |
|-------|------|-------------|

Filler fields are not displayed as part of the input HTML. For example, the following MFS source would not result in a text entry field on the input HTML form:

. . .

MFLD LTH=6

. . .

The POST method is used to transmit the user's data, and the destination of the ACTION is the generated CGI-BIN executable on the Web server. IMS Web uses the path specified by the user to IMS Web Studio to build the URL of the ACTION.

The form's contents are submitted to IMS using the SUBMIT button, and fields are reset to null using the RESET button.

D(a2) How to Modify Input HTML

To modify the input HTML, the user edits the HTMproject_name.HTM file that was generated by IMS Web Studio. project_name is the name of the IMS Web Studio project used by the user to build their IMS Web application. The user can tailor the input HTML for their environment, keeping in mind the following:

Because the generated code still contains the code that processes the corresponding attribute, the result is the same as not providing any data for the field. For example, if the corresponding input MFLD specified a default literal, the literal value would be used in the input message field. If the corresponding input MFLD did not specify a default literal, the field would be padded as specified in the MFS source.

Removing an input attribute from the generated class and CGI-BIN program is not recommended, as this could result in an incorrect input message going to the IMS application.

After the user has modified the input HTML, it should be placed in the appropriate directory on the Web server and linked from one of the user's Web pages.

D(b1) How the CGI-BIN Program Is Generated

Include files

The CGI-BIN program includes interface files for all the classes it uses:

HTMproject-name.HPP, the class that parses the input HTML string

HWSinput_lpage.HPP, the class that corresponds to the single input page

HWSoutput_lpage-1.HPP, the class that corresponds to the first output page

. . .

HWSoutput_lpage_n.HPP, the class that corresponds to the nth output page

Program logic

Receive the input HTML string (CIN).

Pass the input HTML string to the constructor of the parse class to instantiate an object of that class. The object will have attributes corresponding to the input message fields. The constructor parses the HTML string and uses the values obtained as its attribute values.

Set the attributes of the input page object (transaction object) from:

The values specified to IMS Web Studio (RACF userID, and so forth)

The attribute values of the parse object

Invoke the execute method of the input page object to:

Build the input message

Pass the input message to the IMS application for processing

Return the output message object to the CGI-BIN program

Invoke the genHTML method of the output message object returned from execute to build and send (COUT) output HTML for the output message logical pages.

D(b2) How the genHTML Method Is Generated

The output HTML is built dynamically by the generated CGI-BIN program. In IMS Web, it is built as a definition list. The generated CGI-BIN program invokes the genHTML message to add <DT><DD> entries for each output message field to a buffer. The buffer is output to standard out using the COUT statement.

The genHTML method is generated based on the message output descriptor (MSG TYPE=OUTPUT) of the MFS source. Each <DT><DD> pair of the definition list corresponds to a field of the output message (MFLD), and is added to the buffer by a block of code in genHTML. genHTML sets the definition term to the name of the output message field and the definition to the value of the output message field. The <DT><DD> pairs are arranged in the buffer in the same order as the MFLD statements within the message output descriptor, with the following exceptions:

If a field has associated attribute bytes, they are not included in the definition list. Only the data portion of the output message field is represented by a <DT><DD> pair.

A system control area field (SCA) is not included in the definition list.

All defined output fields are included in the definition list, even fields of a null or short segment.

D(b3) How to Modify the Output HTML

To modify the output HTML, the user modifies the generated code that builds the buffer of output HTML. This can bee accomplished in either of the following ways:

Modify the genHTML method described earlier

Replace the invocation of genHTML in the CGI-BIN program with the user's own code that uses the genList method to access the fields of the output method genHTML and genList are methods of the lpage of an output message. If an output message consists of multiple pages, genHTML and genList methods exist for each output page, each tailored to build HTML appropriate to the page. Modify the methods for each output page that could possibly be returned by the IMS application.

Because the generated code still contains the code that processes the corresponding attribute, do not remove any of the code that iterates through the list of output attributes.

After the user has modified the code that builds the buffer of output HTML, they should rebuild the executable CGI-BIN program and put the executable in the appropriate directory on the Web server.

ENVIRONMENT

The present invention may be incorporated for use on a IBM PC or equivalent compatible system, including non-IBM systems. IMS is generally operated on a general purpose computer, such as the IBM 3090, and may be implemented on a client/server environment such as a IBM 3270 based system. Other IBM and non-IBM compatible computer hardware and software embodiments are envisioned for implementation of the IMS platform. The World Wide Web access may be obtained through connections using known commercial Internet providers using known Web Browsers. Of course any equivalent methods, existing or future, of accessing the Web would be acceptable for implementation of the present invention.

CONCLUSION

A system and method has been shown in the above embodiments for the effective implementation of a communicating between IMS and the World Wide Web. While various preferred embodiments have been shown and described, it will be understood that there is no intent to limit the invention by such disclosure, but rather, is intended to cover all modifications and alternate constructions falling within the spirit and scope of the invention as defined in the appended claims.

Appendix A

IMS WEB—SAMPLES

This example shows how a legacy payroll application that adds new employees to the payroll system can be easily converted to a Web application using IMS Web. In Release 1, IMS Web applications are based on the MFS source of the legacy application.

MFS source

The following MFS source shows the 3270 Model 1 screen format used in the legacy application, a well as the input and output message descriptors. First you type the employee information in the appropriate fields on the 3270 screen, then press ENTER to send the input message. The application program uses the "MSGFLD" to confirm the addition, as well as echoing the input data.

```
PAYF    FMT
        DEF         TYPE=(3270,1), FEAT=IGNORE, DSCA=
                    X'00A0', SYSMSG=MSGFLD
        DIV         TYPE=INOUT
        DPAGE       CUSOR=((3,13))
        DFLD        '****EMPLOYEE PAYROLL ****', POS=(1,8)
        DFLD        'LAST NAME:', POS=(4,2)
LNAME   DFLD        POS=(4,13), LTH=20
        DFLD        'FIRST NAME:', POS=(5,2)
FNAME   DFLD        POS=(5,14), LTH=20
        DFLD        'EMPL NO:', POS=(6,2)
EMPNO   DFLD        POS=(6,11), LTH=5
        DFLD        'SOC SEC NO.:', POS=(7,2)
SSN     DFLD        POS=(7,15), LTH=11
        DFLD        'RATE OF PAY:$', POS=(8,2)
RATE    DFLD        POS=(8,16), LTH=9
MSGFLD  DFLD        POS=(10,2), LTH=50
DATE    DFLD        POS=(10,55), LTH=8
        FMTEND
PAYIN   MSG         TYPE=INPUT, SOR=(PAYF, IGNORE), NXT=
                    PAYOUT
        SEG
        MFLD        'PAYADD'
        MFLD        LNAME, LTH=20
        MFLD        FNAME, LTH=20
        MFLD        EMPNO, LTH=5
        MFLD        SSN, LTH=11
        MFLD        RATE, LTH=9, JUST=R, FILL=C'0'
        MSFEND
PAYOUT  MSG         TYPE=OUTPUT, SOR=(PAYF, IGNORE),
                    NXT=PAYIN, OPT=1, FILL=NULL
        SEG
        MFLD        LNAME, LTH=20
        MFLD        FNAME, LTH=20
        SEG
        MFLD        EMPNO, LTH=5
        MFLD        SSN, LTH=11
        SEG
        MFLD        RATE, LTH=9
        SEG
        MFLD        MSGFLD, LTH=50
        MFLD        (DATE, DATE2)
        MSGEND
```

Generated files

The IMS Web application is generated using the IMS Web Studio tool. Once you have created an IMS Web Studio project and inserted the above MFS source file into the project, you are ready to generate and build your new IMS Web application. Although the MFS source file contains both a FMT statement and MSG statements, IMS Web ignores the FMT statement and uses only the MSG statements in the generation process.

For an IMS Web Studio project with the name HTMPAYF, IMS Web studio generates the following files:
HTMPAYF.HTM This file contains the HTML form used to input data to the IMS application. The generated HTML uses the POST method to invoke the generated CGI-BIN program, and uses the Web server path you provided to IMS Web Studio for its URL.

Figure 13:
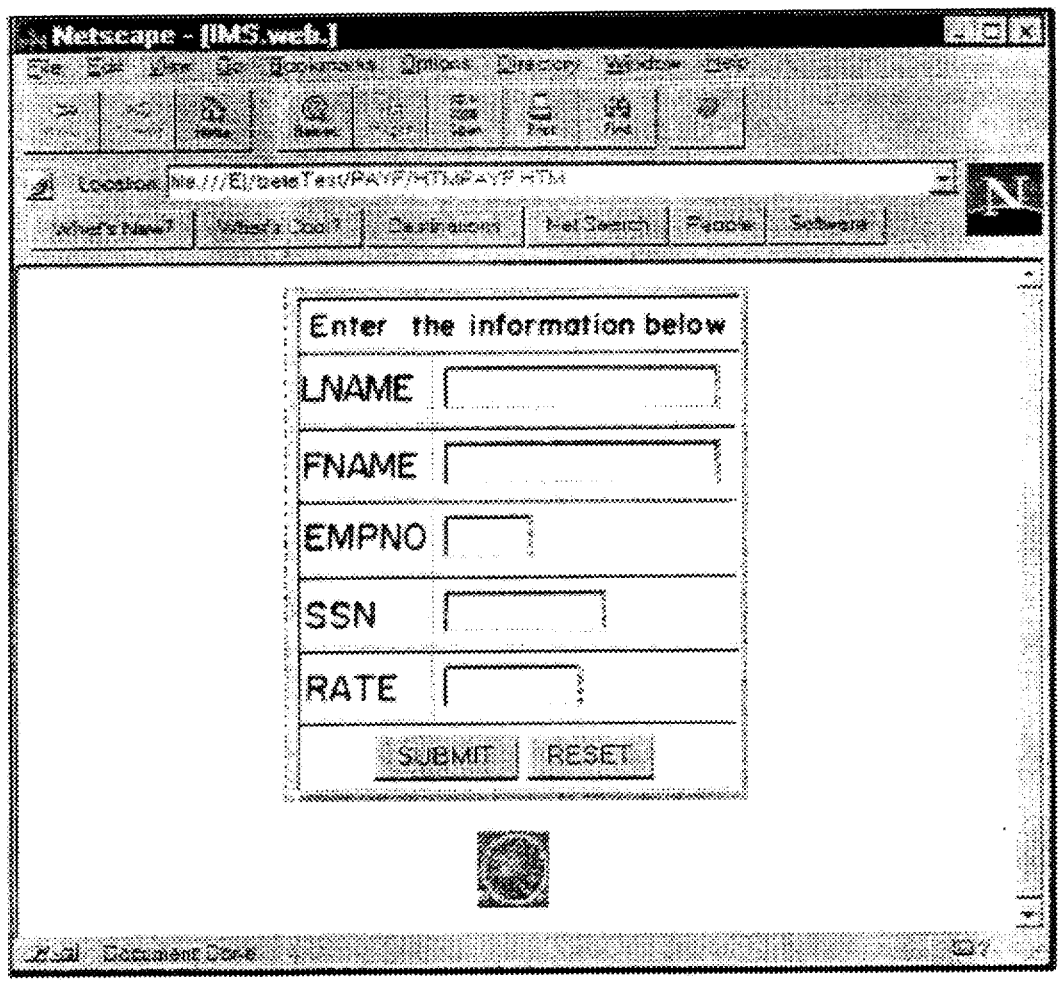
FIG. 13 illustrates an IMS Web Studio interface default HTML input form.

The input form that corresponds to the default HTML file is shown in FIG. 13.
CGIPAYF.CPP This is the CGI-BIN program. Its executable form runs on your Web Server. The CGI-BIN program uses the classes described below to parse the string from the HTML form, submit an input message containing the data from the HTML form to the IMS application, then present the data in the output message from the IMS transaction to the Web browser. All you need to do is build its executable form using the generated MAKE file described below.
HTMPAYF.HPP This file contains the interface of the class that parses the string received from the input HTML form. This class is used byt the generated CGI-BIN program.
HTMPAYF.CPP This file contains the implementation of the class that parses the string received from the input HTML form.
HWSLPG01.HPP This file contains the interface of the input logical page class. Because the MFS source does not include an input LPAGE statement, IMS Web generates a default logical page. This class is used by the generated CGI-BIN program.

Class Name

HWSLPG01In

Parent Class

HWSTranIn

Public Attributes

None

Private Attributes

HWSMF001, LNAME, FNAME, EMPNO, SSN, RATE

Public Methods execute setHWSMF001, getHWSMF001 setLNAME, getLNAME setFNAME, getFNAME setEMPNO, getEMPNO setSSN, getSSN setRATE, getRATE Private Methods export

HWSLPG01.CPP

This file contains the implementation of the input logical page class.
HWSLPG02.HPP This file contains the interface of the output logical page class. Because the MFS source does not include an output LPAGE statement, IMS Web generates a default logical page. This class is used by the generated CGI-BIN program.

Class Name

HWSLPG02Out

Parent Class

HWSTranOut

Public Attributes

None

Private Attributes

LNAME, FNAME, EMPNO, SSN, RATE, MSGFLD, DATE

Public Attributes genHTML genList getLNAME getFNAME getEMPNO getSSN getRATE getMSGFLD getDATE Private Methods
None
HWSLPG02.CPP This file contains the implementation of the output logical page class.

CGIPAYF.MAK

This file is used to build the executable form of the CGI-BIN program, CGIPAYF.EXE.

You invoke the NMAKE utility from the command line.

Modifying input HTML

As mentioned above, IMS Web does not use information in the MFS FMT statement associated with a transaction. Hence the literal information that is used to identify fields on the original 3270 screen is not available for the generated HTML. To create an input HTML form that is very similar to the original 3270 display screen, modify the generated HTML as follows:

1. Left align the table.
2. Replace the text preceding each text entry field with the literal used in the MFS FMT statement.
3. Add a heading and horizontal rule.
4. Remove the IMS Web image.

Figure 14:
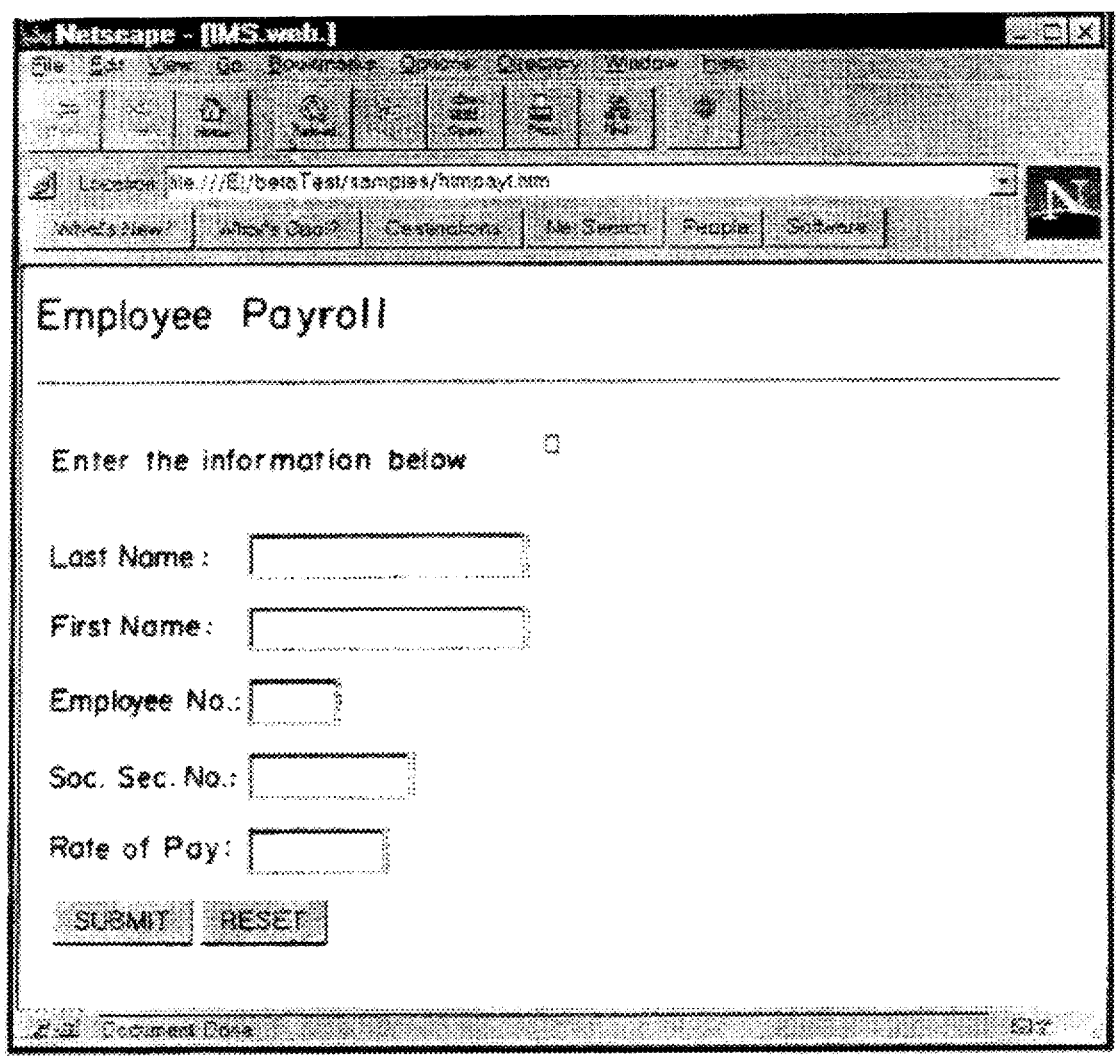
FIG. 14 illustrates an IMS Web Studio interface modified HTML input form.

The modified form is shown in FIG. 14, followed by a link to the modified HTML.

Modified output HTML

Figure 15:
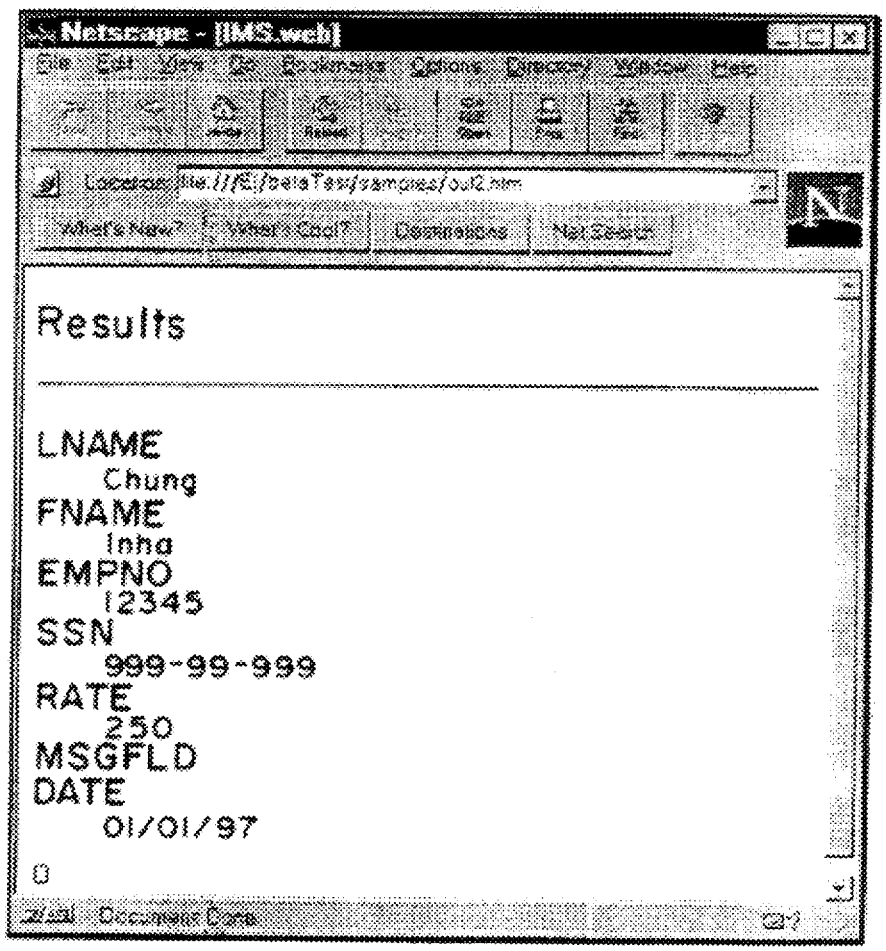
FIG. 15 illustrates an IMS Web Studio interface default HTML output form.
Figure 16:
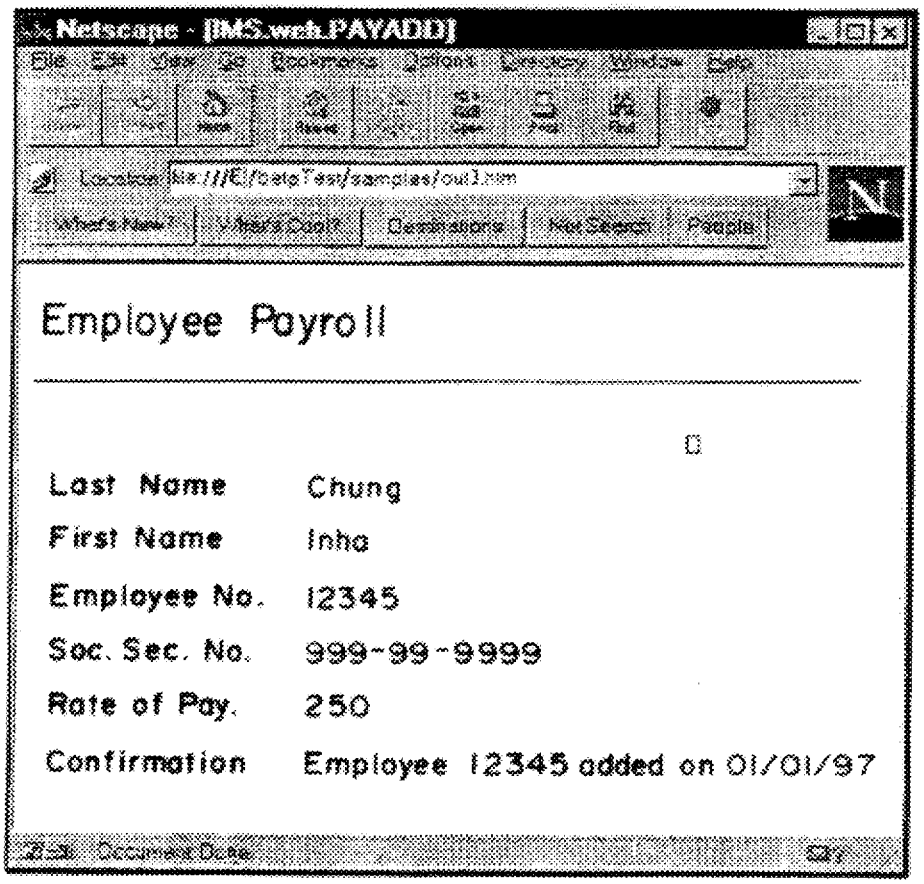
FIG. 16 illustrates an IMS Web Studio interface modified HTML output form.

The CGI-BIN program uses the getHTML method of the output 1page to generate the output HTML. In this example, the HTML shown in FIG. 15, is sent to the Web browser:

As is the case for input HTML, the output HTML is more meaningful if it is modified to look like the original 3270 screen. Because the CGI-BIN program dynamically builds the output HTML, you must modify the code of the CGI-BIN program. The following code segments show how you can modify the CGI-BIN program and the genHTML method to produce the output HTML shown in FIG. 16.

We claim:

1. A computer-based method of linking a World Wide Web transaction-based process to a IMS application environment comprising:

defining at least a first TCP/IP connection within said transaction-based process;

defining an input HTML form;

entering IMS request data into said HTML form;

determining at least one message input descriptor for said IMS request data;

formatting said IMS request data based on said message input descriptor;

routing said formatted IMS request to said IMS application environment;

processing the IMS request;

determining at least one message output descriptor for said processed IMS request, and returning said processed IMS request from said IMS application environment, formatted with said output descriptors, to said TCP/IP connection.

2. A computer-based method of linking a World Wide Web transaction-based process to a IMS application environment as per claim 1, wherein said TCP/IP connection is made by a Web client to a Web Server on the World Wide Web (WWW).

3. A computer-based method of linking a World Wide Web transaction-based process to a IMS application environment as per claim 1, wherein said method further comprises downloading MFS source files during said at least a first TCP/IP connection.

4. A computer-based method of linking a World Wide Web transaction-based process to a IMS application environment as per claim 3, wherein said downloading step includes a GUI-based input guide providing browse and downloading capabilities.

5. A computer-based method of linking a World Wide Web transaction-based process to a IMS application environment as per claim 1, wherein said formatting step includes inputting said IMS request data to a CGI-BIN program for processing.

6. A computer-based method of linking a World Wide Web transaction-based process to a IMS application environment as per claim 5, wherein said routing step includes converting said CGI-BIN processed IMS request data from a TCP/IP protocol to an OTMA protocol.

7. A computer-based method of linking a World Wide Web transaction-based process to a IMS application environment comprising:

defining at least a first TCP/IP connection from a Web client to a web server;

browsing and downloading MFS source files using a Web browser;

determining at least one message input descriptor for IMS request data based on said downloaded MFS source files;

defining an input HTML form;

determining class definitions for said IMS request data;

building a CGI-BIN program based on said downloaded MFS source files and said IMS request;

entering IMS request data into said input HTML form;

transmitting said HTML IMS request data to said CGI-BIN program;

parsing said HTML IMS request data based on said class definitions;

formatting said parsed IMS request data based on said message input descriptor;

routing said formatted IMS request to said IMS application environment;

processing the IMS request;

determining at least one message output descriptor for said processed IMS request, and returning said processed IMS request from said IMS application environment, formatted with said output descriptors, to said TCP/IP connection.

8. A computer-based method of linking a World Wide Web transaction-based process to a IMS application environment as per claim 7, wherein said browsing, downloading, determining said message input descriptors and determining class definitions steps include a GUI-based input guide.

9. A computer-based method of linking a World Wide Web transaction-based process to a IMS application environment as per claim 7, wherein said routing step includes converting said CGI-BIN processed IMS request data from a TCP/IP protocol to an OTMA protocol and said return step includes converting said returned IMS request data from a OTMA protocol to an TCP/IP protocol.

10. A computer-based method of linking a World Wide Web transaction-based process to a IMS application environment as per claim 7, wherein said class definitions are C++ class definitions.

11. A computer program product, useable on a computer-based system, linking a World Wide Web transaction-based process to a IMS application environment comprising:

a graphical user interface(GUI) comprising a series of input templates comprising:

a new IMS request project template;

a browsing and downloading MFS source files template;

a message input descriptor template;

a plurality of class defining templates;

an input HTML form based on at least one message input descriptor entered in said message input descriptor template;

class definitions derived from said downloaded MFS source files;

a CGI-BIN program built from said class definitions, and wherein said input HTML form is populated with IMS request data, sent to said CGI-BIN program where it is parsed using said class definitions, formatted and routed to said IMS application environment for retrieval of the IMS request data.

12. A computer program product, useable on a computer-based system, linking a World Wide Web transaction-based process to a IMS application environment as per claim 11, wherein said routing step includes converting said CGI-BIN formatted IMS request data from a TCP/IP protocol to an OTMA protocol.

13. A computer program product, useable on a computer-based system, linking a World Wide Web transaction-based process to a IMS application environment as per claim 11, wherein said retrieved IMS request data is converted from OTMA to TCP/IP, sent to said CGI-BIN program and a dynamic output HTML form is populated with said retrieved IMS request data.

14. A computer program product, useable on a computer-based system, linking a World Wide Web transaction-based process to a IMS application environment as per claim 11, wherein said class definitions are C++ class definitions.

15. A computer program product, useable on a computer-based system, linking a World Wide Web transaction-based process to a IMS application environment as per claim 14, wherein said C++ class definitions are created for each logical page.

16. A system for linking the World Wide Web to and IMS application environment comprising:

a Web client requesting computer;

a Web studio program, including a graphical user interface(GUI) comprising:
    means to download MFS source files;
    means to determine message input descriptors;
    means to determine class definitions;
    means to create an input HTML form;
    means to build a CGI-BIN program;

a TCP/IP OTMA adapter;

a link to data located within said IMS application environment;

a dynamic output HTML form, and wherein IMS request data supplied by said web client requesting computer populates said input HTML form, is parsed by said CGI-BIN program and supplied to said TCP/IP adapter which communicates directly with the IMS application environment to retrieve IMS request data which is returned to said Web client requesting computer through said dynamic output HTML form.

17. A system for linking the World Wide Web to and IMS application environment comprising as per claim 16, wherein said retrieved IMS request data is converted from OTMA to TCP/IP, sent to said CGI-BIN program and said dynamic output HTML form is populated with said retrieved IMS request data from said CGI-BIN program.

18. A system for linking the World Wide Web to and IMS application environment comprising as per claim 16, wherein said class definitions are C++ class definitions.

19. A system for linking the World Wide Web to and IMS application environment comprising as per claim 16, wherein said C++ class definitions are created for each logical page.

* * * * *

UNITED STATES PATENT AND TRADEMARK OFFICE
CERTIFICATE OF CORRECTION

PATENT NO. : 5,781,739

DATED : July 14, 1998

INVENTOR(S) : Bach et al.

It is certified that error appears in the above-identified patent and that said Letters Patent is hereby corrected as shown below:

Column 1, line 5, delete "of the sure" and insert --of the disclosure--.

Column 1, line 31, before "computer" insert -- A --.

Column 11, line 5, under "MFLD" insert -- -- . . . -- --.

Column 11, line 15, under "MFLD" insert -- -- . . . -- --.

Column 11, line 24, under "MFLD" insert -- -- . . . -- --.

Column 11, line 56, rewrite "_page" as -- _lpage --.

Column 12, line 14, rewrite "users" as -- user's --.

Column 13, line 31, under "MFLD" insert -- -- . . . -- --.

Column 14, line 46, over "M0001" insert -- ... --.

Column 14, line 48, under "M0001" insert -- ... --.

Column 15, line 30, rewrite "page" as -- lpage --.

Column 16, line 15, rewrite "bee" as -- be --.

Column 16, line 22, rewrite "pages" as -- lpages --.

Column 16, lines 23 and 24, rewrite "page" as -- lpage --, (3 occurrences).

UNITED STATES PATENT AND TRADEMARK OFFICE
CERTIFICATE OF CORRECTION

PATENT NO. : 5,781,739
DATED : July 14, 1998
INVENTOR(S) : Bach et al.

It is certified that error appears in the above-identified patent and that said Letters Patent is hereby corrected as shown below:

Column 17, line 11, rewrite "X'00A0'" as - - X' 00A0' - -.

Column 18, line 9, rewrite "byt" as - - by - -.

In the Claims:

Claim 16, line 1, rewrite "and" as --a--.
Claim 17, line 1, rewrite "and" as --a--.
Claim 18, line 1, rewrite "and" as --a--.
Claim 19, line 1, rewrite "and" as --a--.

Signed and Sealed this

Second Day of February, 1999

Attest:

Attesting Officer

*Acting Commissioner of Patents and Trademarks*